Patented Nov. 21, 1922.

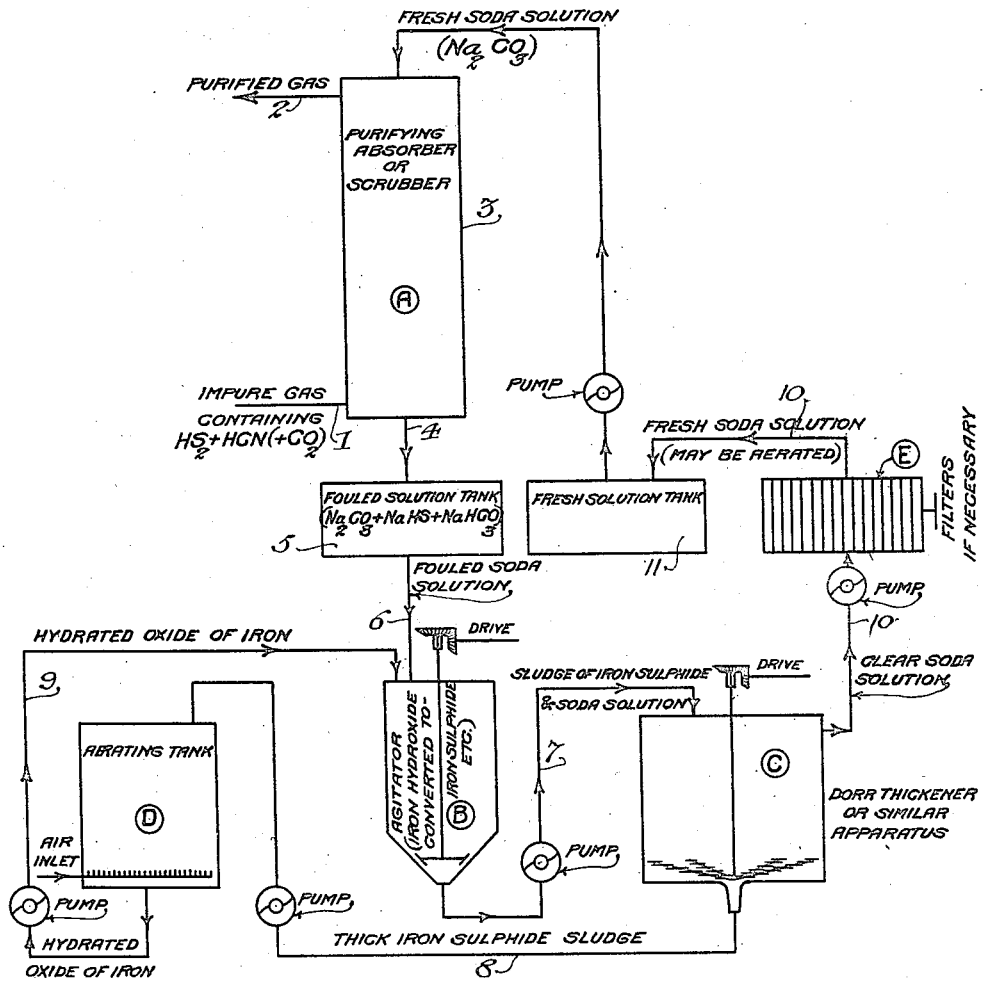

1,436,196

UNITED STATES PATENT OFFICE.

CHARLES J. RAMSBURG, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

GAS-PURIFICATION PROCESS.

Application filed December 8, 1921. Serial No. 520,781.

*To all whom it may concern:*

Be it known that I, CHARLES J. RAMSBURG, a citizen of the United States, residing in Pittsburgh, in the county of Allegheny and State of Pennsylvania, have invented a new and useful Improvement in Gas-Purification Processes, of which the following is a specification.

This invention relates to the removal of hydrogen sulphide and other noxious constituents, such as hydrocyanic acid, from gases containing them. Objects of the invention are to effect an efficient purification of the gases by means of an absorbent liquid which removes the noxious constituents, combined with a revivification of the absorbent liquid by a subsequent treatment that removes substantially all the absorbed sulphur in a solid form, whereby the escape of noxious fumes into the atmosphere in the vicinity of the gas purifying plant is avoided.

In addition to the general objects recited above, the invention has for further objects such other improvements or advantages in operation and results as are found to obtain in the processes hereinafter described or claimed.

In the accompanying drawing, forming a part of this specification and showing, for purposes of exemplification a preferred form and manner in which the invention may be embodied and practiced but without limiting the claimed invention specifically to such illustrative instance:

The figure illustrates a diagrammatic representation of apparatus for carrying out the improved gas purifying process of the present invention.

In its present embodiment, the invention is applied to the purification of fuel gases, such as coke oven gas; for convenience, the present description will be confined to this important application of the invention. Features of the invention are, however, readily susceptible of other valuable applications; consequently, the invention is not confined in its scope to the specific use and embodiment herein described as an illustrative example.

In carrying out the invention, the gases, after the tar and ammonia have been removed, are brought into contact with an absorbent agent constituted of a purifying solution which is alkaline in reaction, for example a sodium carbonate solution. The concentration of the solution may be varied as desired; in practice, a one to five per cent solution of sodium carbonate will be found satisfactory. The gases to be purified enter the bottom of the scrubber or washer A through a gas line 1 and discharge from the top of said scrubber through the purified gas-line 2. The purifying solution is delivered to the top of the scrubber A through the solution line 3 and the solution containing the absorbed impurities discharges from the bottom of said scrubber through a line 4 into a foul solution tank or sump 5. In the scrubber, the solution absorbs the hydrogen sulphide and other noxious constituents of the gases, forming soluble sulphide compounds, such as sodium hydrogen sulphide. Carbon dioxide if present in the gas, is also absorbed.

The resulting foul solution is passed from the tank 5 through a line 6 into a mechanical agitator B in which said solution is brought into intimate contact with hydrated iron oxide, with the result that a suspension of iron oxide is formed in the solution. Because of the affinity of the iron oxide in suspension for the sulphur absorbed from the alkali the iron is converted to iron sulphide in the agitator B and the alkali is regenerated, in that it is restored substantially to its original state. The concentration of the iron oxide in the suspension in the agitator may be varied as desired; in practice, however, a two or three per cent suspension of iron oxide will be found satisfactory. Various iron compounds may be employed for this purpose, as stated later, but in the present exemplification reference is made to iron oxide only.

The mixture of regenerated alkali solution and iron sulphide is then pumped through a line 7 into a continuous separator C, such as a Dorr thickener, resulting in a separation of the iron sulphide as a heavy sludge from the clear alkaline liquor. The thick iron sulphide sludge is pumped through a line 8 into a tank D where it is aerated and thereby converted to iron oxide and free sulphur. The regenerated iron oxide and free sulphur may be pumped through a line 9 back to the agitator B to treat further quantities of foul alkaline liquor from the absorber A. The regenerated alkaline solution discharges from the Dorr thickener C through a line 10 and is treated in a filter press E, to remove any suspended iron compounds remaining in it; the alkaline solution may also be subjected to an aerating treatment, to remove any residual sulphur. The alkaline solution is then ready to go to the absorber A to purify more gas, and may be stored in a tank 11 for being pumped back to the said scrubber. The whole process may be made continuous by carrying it out as above described and in the manner illustrated in the diagram of the apparatus.

If desired, the thick iron sulphide sludge from the Dorr thickener C or separator may be filter-pressed and washed before aerating.

Mechanical efficiency of the process is assured by using a clear solution in the scrubber where the gas has to be handled. The steps in the process which involve the iron oxide suspension in the solution are all carried out outside of the scrubber where they can be conveniently performed.

The chemical reactions taking place in the absorption stage may be exemplified by the following equations:

(a) Absorption of hydrogen sulphide by sodium carbonate:

$$Na_2CO_3 + H_2S = NaHS + NaHCO_3$$

(b) Carbon dioxide, if present, is also absorbed:

$$Na_2CO_3 + H_2O + CO_2 = 2NaHCO_3$$

(c) Hydrocyanic acid, if present, is also absorbed:

$$Na_2CO_3 + HCN = NaCN + NaHCO_3$$

The chemical reaction in the agitator may be exemplified by the following equation:

Conversion of iron oxide to iron sulphide and regeneration of the alkali:

$$Fe_2O_3 + 3NaHS + 3NaHCO_3 = Fe_2S_3 + 3Na_2CO_3 + 3H_2O$$

The chemical reactions during aeration of the iron sulphide sludge may be as follows:

Oxidation of iron sulphide to iron oxide and free sulphur:

$$2Fe_2S_3 + 3O_2 = 2Fe_2O_3 + 6S$$

By aerating the clear alkaline liquor, sodium bicarbonate is converted to carbonate, according to the following equation:

$$2NaHCO_3 = Na_2CO_3 + CO_2 + H_2O$$

The free sulphur may be be accumulated in the suspension of iron oxide, part of the sludge being withdrawn at suitable times for the recovery of the sulphur and iron oxide. From time to time, fresh iron oxide is added; or else iron sulphide may be added at a point before the air treatment which will convert it to iron oxide. The concentration of dissolved alkali in the solution is also maintained by periodical additions.

The chemical reaction in the agitator can be carried out with iron oxide in suspension, or instead of iron oxide, other ferric compounds may be used which have essentially the same action, namely such compounds as ferric carbonate, basic ferric carbonate, ferric oxide, or ferrous compounds of iron. The solution used in the absorber may contain any soluble alkaline substance, such as the carbonates or hydroxides of sodium and potassium. The solution will remove hydrocyanic acid from the gas; the hydrocyanic acid may go into chemical combination with the iron compounds, or else may pass out to some extent with the air used in the aerating process.

What is claimed is:

1. The process of purifying gases which consists in: passing the gas into contact with an absorbent solution constituted of dissolved alkali to absorb sulphur from the gas; then bringing the solution containing the absorbed impurities into contact with a suspension of an iron compound whereby a reaction occurs in which sulphur is transferred from the alkali to the iron, with formation of iron sulphide; then separating out the iron sulphide from the rejuvenated solution and subjecting the iron sulphide to aeration to remove the sulphur and restore the iron to its original state; and employing the rejuvenated alkali solution for further gas purification; substantially as specified.

2. The process of purifying gases which consists in: passing the gas into contact with an absorbent solution constituted of dissolved sodium carbonate to absorb sulphur from the gas; then bringing the solution containing the absorbed impurities into contact with a suspension of an iron compound whereby a reaction occurs in which the sulphur is transferred from the sodium carbonate to the iron, with formation of iron sulphide; then separating out the iron sulphide from the rejuvenated solution and subjecting the iron sulphide to aeration to remove the sulphur and restore the iron to its original state; and employing the rejuvenated sodium carbonate solution for further gas purification, substantially as specified.

3. The process of purifying gases which consists in: passing the gas into contact with an absorbent solution constituted of dissolved alkali to absorb sulphur from the gas; then bringing the solution containing the absorbed impurities into contact with a suspension of an iron oxide whereby a reaction occurs in which sulphur is transferred from the alkali to the iron, with formation of iron sulphide; then separating out the iron sulphide from the rejuvenated solution and subjecting the iron sulphide to aeration to remove the sulphur and restore the iron to its original state; and employing the rejuvenated alkali solution for further gas purification; substantially as specified.

4. The process of purifying gas which consists in: passing the gas into contact with an absorbent solution constituted of dissolved alkali to absorb sulphur from the gas; then bringing the solution containing the absorbed impurities into contact with an iron compound, whereby a reaction occurs in which sulphur is transferred from the alkali to the iron, with formation of iron sulphide; returning the rejuvenated alkali solution to the gas purification step; and subjecting the iron sulphide to aeration to remove the sulphur and restore the iron to its original state; substantially as specified.

CHARLES J. RAMSBURG.